US010074283B1

(12) United States Patent
de Oliveira et al.

(10) Patent No.: US 10,074,283 B1
(45) Date of Patent: Sep. 11, 2018

(54) RESILIENT ENHANCEMENT OF TRAJECTORY-BASED OPERATIONS IN AVIATION

(71) Applicant: The Boeing Company, Chicago, IL (US)

(72) Inventors: Italo Romani de Oliveira, Sao Jose dos Campos (BZ); Jose A. Fregnani, Sao Jose dos Campos (BZ)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/454,524

(22) Filed: Mar. 9, 2017

(51) Int. Cl.
*G08G 5/00* (2006.01)
*G08G 5/02* (2006.01)
*G06Q 50/30* (2012.01)

(52) U.S. Cl.
CPC .......... *G08G 5/0039* (2013.01); *G06Q 50/30* (2013.01); *G08G 5/0013* (2013.01); *G08G 5/0026* (2013.01); *G08G 5/025* (2013.01)

(58) Field of Classification Search
CPC .... G08G 5/0039; G08G 5/025; G08G 5/0013; G08G 5/0026; G06Q 50/30; G06Q 10/06
See application file for complete search history.

(56) References Cited

U.S. PATENT DOCUMENTS

| | | | | |
|---|---|---|---|---|
| 6,873,903 B2* | 3/2005 | Baiada | ................ | G08G 5/0043 340/961 |
| 8,886,446 B1* | 11/2014 | Baiada | .............. | G06Q 10/0631 244/75.1 |
| 2010/0305781 A1 | 12/2010 | Felix | | |
| 2012/0245834 A1* | 9/2012 | Klooster | ............. | G08G 5/0034 701/120 |
| 2016/0371988 A1* | 12/2016 | Weber | ................. | G08G 5/0043 |
| 2017/0372621 A1* | 12/2017 | Borgyos | ............... | G08G 5/0039 |

OTHER PUBLICATIONS

Balakrishnan et al., "Optimal Large-Scale Air Traffic Flow Management," Massachusetts Institute of Technology, 34 pages, dated 2014, downloaded on Jan. 14, 2017, available at: http://www.mit.edu/~hamsa/pubs/BalakrishnanChandran_ATFM.pdf.

(Continued)

*Primary Examiner* — Michael J Zanelli
(74) *Attorney, Agent, or Firm* — McDonnell Boehnen Hulbert & Berghoff LLP

(57) ABSTRACT

An example method includes determining a probable flight trajectory for each respective flight; modifying the probable flight trajectory based on constraints imposed by Air Traffic Controller (ATC) rules to generate a modified flight trajectory; assigning respective arrival slots for modified flight trajectories; receiving trajectory exchange information indicating that two aircraft operators have exchanged two respective flight trajectories associated with two respective flights operated by the two aircraft operators; based on the trajectory exchange information, modifying: (i) the two respective flight trajectories, and (ii) respective arrival slots assigned to the two respective flight trajectories; and transmitting, by the computing device, the modified two respective flight trajectories to respective aircraft assigned to perform the two respective flights.

20 Claims, 8 Drawing Sheets

(56) References Cited

OTHER PUBLICATIONS

Bertisimas et al., "A Proposal for Network Air Traffic Flow Management Incorporating Fairness and Airline Collaboration," dated Apr. 25, 2011, 38 pages.
Schummer et al., "Assignment of Arrival Slots," American Economic Journal: Microeconomics 2013 5(2): pp. 164-185.
Taylor et al., "Designing Traffic Flow Management Strategies Under Uncertainty," Eleventh USA/Europe Air Traffic Management Research and development Seminar (ATM2015), dated Jun. 23, 2015, 10 pages.
Balakrishnan, H. . Control and Optimization Algorithms for Air Transportation Systems. Annual Reviews in Control, 41, 39-46, dated Feb. 16, 2016.
Gao. Slot-Controlled Airports. FAA's Rules Could be Improved to Enhance Competition and Use of Available Capacity, GAO-12-902, dated Sep. 13, 2012.
Jonge, H. d., Visser, H., & Seljée, R. (2015). Optimizing and Prioritizing Air Traffic Flow Management in a European Scenario, Air Transport and Operations Symposium, dated Jun. 2015.
Romani de Oliveira, Í., Siewerdt, E, & Myiamaru, D. O. (2009). Redução de Atrasos em Tráfego Aéreo por Meio do Algoritmo de Entropia Cruzada. VIII Simpósio de Transporte Aéreo. São Paulo. doi:10.13140/2.1.3155.1688, dated Nov. 2009.
Landing Slot. Wikipedia: https://en.wikipedia.org/wiki/Landing_slot, dated Nov. 13, 2016.

* cited by examiner

RESILIENT ENHANCEMENT OF TRAJECTORY-BASED OPERATIONS IN AVIATION

FIELD

The present disclosure relates generally to air traffic and operations in aviation.

BACKGROUND

There is a distinction between strategic air traffic flow management, the plans for which could begin up to years ahead and can be adjusted up to a few hours before the operation, and the tactical interventions of Air Traffic Controller (ATC). This dichotomy happens in part because of events with little predictability that may take place in an airspace or airport, and in part because there is lack of accurate trajectory models and standards throughout the air transportation system.

In order to promote and maintain predictability, major airports around the world control the flow of aircraft traffic in and out on the basis of slots. A slot is a time window inside which the designated flight is expected to arrive or depart. If the flight misses its slot, it waits for an opportunity window, and the waiting time for the opportunity window is highly variable and could be long. This problem is aggravated if the accuracy of air traffic predictions is low. It may thus be desirable to have a system that predicts air traffic more accurately to find a suitable opportunity window and avoid further delays.

Another source of inefficiency in the current air transportation system is the slot allocation system, which includes a seasonal planning as well as day-to-day operational adjustment. The slot allocation system is rendered inefficient by the fact that each country or region, in which the slots are made available, has its own applicable regulations and may have its own understanding of what a slot is and how slots are managed. According to current regulations, a slot belongs to an airline as long as it uses 80% of the time in the previous season. Therefore, the slot is effectively a property owned by the airline. Treating a slot as a property and the current disruption traffic management rules cause rigidities and inefficiencies in air traffic.

It may thus be desirable to have systems with advanced prediction capabilities to provide more refined and accurate allocation of the airspace and airport resources and to expedite transactions of such resources between the stakeholders. Such system may increase the net efficiency of air traffic operations.

SUMMARY

The present disclosure describes embodiments that relate to resilient optimization of trajectory-based operations in aviation.

In one aspect, the present disclosure describes a method for determining flight trajectories for respective flights. The method includes: (i) determining, by a computing device, a probable flight trajectory for each respective flight based on (a) information indicative of weather conditions, (b) information indicative of airspace and airport constraints, (c) information indicative of performance parameters of a respective aircraft assigned to perform the respective flight, and (d) information indicative of a starting point and an ending point of the respective flight; (ii) modifying, by the computing device, the probable flight trajectory based on constraints imposed by Air Traffic Controller (ATC) rules to generate a modified flight trajectory; (iii) assigning, by the computing device, respective arrival slots for modified flight trajectories, wherein each arrival slot indicates a time window of arrival at the ending point of the respective flight; (iv) receiving, at the computing device, trajectory exchange information indicating that two aircraft operators have exchanged two respective flight trajectories associated with two respective flights operated by the two aircraft operators; (v) based on the trajectory exchange information, modifying: (a) the two respective flight trajectories, and (b) respective arrival slots assigned to the two respective flight trajectories; and (vi) transmitting, by the computing device, the modified two respective flight trajectories to respective aircraft assigned to perform the two respective flights.

In another aspect, the present disclosure describes a non-transitory computer readable medium having stored therein instructions that, in response to execution by a computing device, cause the computing device to perform operations to determine flight trajectories for respective flights. The operations include: (i) determining a probable flight trajectory for each respective flight based on (a) information indicative of weather conditions, (b) information indicative of airspace and airport constraints, (c) information indicative of performance parameters of a respective aircraft assigned to perform the respective flight, and (d) information indicative of a starting point and an ending point of the respective flight; (ii) modifying the probable flight trajectory based on constraints imposed by Air Traffic Controller (ATC) rules to generate a modified flight trajectory; (iii) assigning respective arrival slots for modified flight trajectories, wherein each arrival slot indicates a time window of arrival at the ending point of the respective flight; (iv) receiving trajectory exchange information indicating that two aircraft operators have exchanged two respective flight trajectories associated with two respective flights operated by the two aircraft operators; (v) based on the trajectory exchange information, modifying: (a) the two respective flight trajectories, and (b) respective arrival slots assigned to the two respective flight trajectories; and (vi) transmitting the modified two respective flight trajectories to respective aircraft assigned to perform the two respective flights.

In still another aspect, the present disclosure describes a system for determining flight trajectories for respective flights. The system includes: (i) a flight management computing device coupled to a first aircraft and having one or more processors configured to send thrust and attitude commands for the first aircraft to follow an assigned flight trajectory; (ii) one or more databases including information indicative of (a) weather conditions, (b) airspace and airport constraints, and (c) performance parameters of a respective aircraft assigned to perform a respective flight; and (iii) a trajectory management module that is ground-based and in communication with the one or more databases and in communication with the flight management computing device via an air-ground data link. The trajectory management module includes: (i) one or more processors; and (ii) memory storing thereon instructions, that when executed by the one or more processors of the trajectory management module, cause the trajectory management module to perform operations. The operations include: (i) determining a probable flight trajectory for each respective flight based on the information of the one or more databases and information indicative of a starting point and an ending point of the respective flight; (ii) modifying the probable flight trajectory based on constraints imposed by Air Traffic Controller (ATC) rules to generate a modified flight trajectory; (iii) assigning respective arrival slots for modified flight trajectories, wherein each arrival slot indicates a time window of arrival at the ending point of the respective flight; (iv) receiving trajectory exchange information indicating that a first aircraft operator of the first aircraft and a second aircraft operator of a second aircraft have exchanged two respective flight trajectories associated with the first and second aircraft; (v) based on the trajectory exchange information, modifying: (a) the two respective flight trajectories, and (b) respective arrival slots assigned to the two respective flight trajectories; and (vi) transmitting a respective flight trajectory of the two respective flight trajectories to the flight management computing device to execute the respective flight trajectory by the first aircraft.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
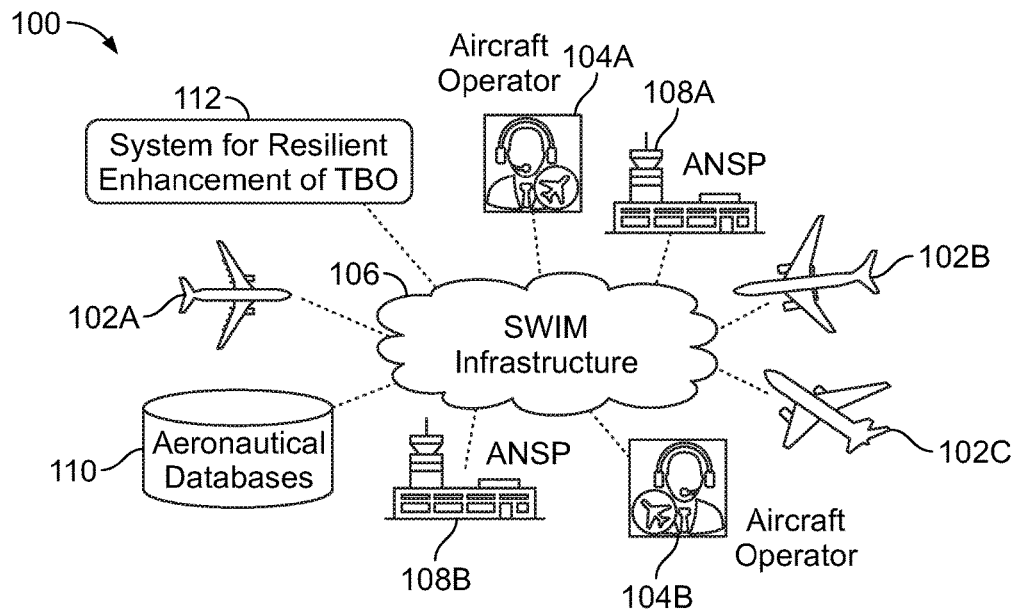
FIG. 1 illustrates an air transportation system, in accordance with an example implementation.

The usage of runways in many busy airports in the world is controlled by allocation of slots which, as mentioned above, are time windows in which the flight is designated to arrive or depart. The institution of slots in an airport happens when demand exceeds capacity of the airport. When slots are instituted, they are distributed among the airlines, for example, in series corresponding to a given time at a given day of the week. These slots can be considered long-term slots and are repeated steadily for a 6-month period. At the end of this period, the slot distribution is revised and new airlines can request particular slots. Airlines which use 80% of their slots in the 6-month period are entitled to the same slots in the next period, and the ones which failed this criterion may lose a number of slots.

Besides the above-mentioned long-term slots, there exists another type of slots, which can be used when any airport or airspace sector suffers an unexpected capacity reduction. An unexpected reduction in capacity could be caused, for example, by bad weather, equipment outages or other restrictive factors. When unexpected capacity reduction occur, ground delay procedures may be implemented based on regulations and policies defined by aviation administration agencies.

One rule for slot operation dictates that if a flight misses its slot by airline-driven causes, the flight waits for some spare slot and there is no guarantee that a spare slot would be found in a short period of time. Better prediction capabilities would enhance slot rescheduling.

In the aforementioned situations of capacity reduction, the number of newly created slots might not accommodate the demand. In this case, a new schedule may be implemented to maximize the usage of the reduced capacity. To implement a new schedule that maximizes the usage of reduced capacity, it may desirable to implement a new schedule that takes into consideration a global view of air traffic, rather than incremental or localized logic, and to give opportunity of collaboration among the airlines. A system that takes into consideration a global view of air traffic and gives airlines the opportunity to collaborate is disclosed herein to reduce capacity waste and decrease operational cost.

Such a system may reduce delays in the case of constrained capacity. In order to reduce delays, it may be desirable that the system avoids incrementality and rigidity when implementing or designing a new schedule that responds to events in the airspace or airports.

The problem of incrementality of the existing solutions results because schedule changes are modeled narrowly, with few degrees of freedom and poor analysis of impact throughout the air traffic network. For example, in the case of arrival slots at an airport, if the system applies the delays linearly among the arriving flights based on a first-planned, first-served rule, the available capacity might not be maximized, because the flights might not be able to comply accurately with the assigned times of arrival. Small deviations caused at other nodes (e.g., other airports) of the traffic network may compound into slot overshooting (arriving later than the deadline). A better result may be achieved, for example, if the delayed flights received higher priority and the whole network schedule is revised to accommodate this new schedule.

In order to avoid incrementality, the systems and methods disclosed herein may accurately determine the impact of schedule changes throughout the traffic network, and implement multi-objective global optimization taking multiple factors and constraints into consideration.

The problem of schedule rigidity could arise because the re-programmed schedules are provided by a central algorithm which might be blind to factors affecting independent airlines, which implement the schedule changes to the individual flights. To avoid such rigidity, the systems and methods disclosed herein allow airlines to make adjustments to the schedule after the main optimization algorithm is run.

Disclosed herein are systems and methods for resiliently enhancing air traffic while reducing incrementality and rigidity when implementing or designing a new schedule that responds to events in the airspace or airports. Particularly, the systems and methods disclosed reduce incrementality by having accurate trajectory prediction capability for multiple interacting flights, given information made available by the System-Wide Information Management (SWIM) infrastructure. Also, the disclosed systems include a comprehensive and continually updated database of flight trajectories with the feature of bi-directional mapping between slot and trajectory. In order to compose accurate trajectory predictions, the systems and methods use accurate airport surface movement models and air traffic control (ATC) airspace models. Within disclosed examples, a multi-objective algorithm for determining four-dimensional (4D) flight trajectories with routing and traffic constraints is implemented.

In order to reduce rigidity and provide more resilience to air traffic plans, the disclosed systems and methods may use probabilistic trajectory information utilizing confidence intervals for the waypoint times and probabilistic forks. The trajectory information may be conveyed in a data format extending the Flight Information Exchange Model (FIXM) format. Particularly, a probable-FIXM or P-FIXM could be used to convey probable trajectories. In other examples, a stochastic version of Aircraft Intent Description Language (AIDL) could be used.

Further, the disclosed systems and methods allow for trajectory exchange between airlines. The disclosed systems may include a trajectory probe and adjustment tool configured to determine potential conflicts for a newly proposed trajectory, and propose modifications for conflict resolution, thus decreasing the probability of delays.

In order to allow for proper execution of the chosen or selected trajectories, the disclosed systems may include air-ground data link for sending (uplinking) and receiving (downlinking) trajectories and aircraft intents to and from the aircraft Flight Management Computers (FMCs). The FMCs may be capable of issuing thrust and attitude commands in a closed-loop feedback control manner to guide aircraft to accomplish the times required at the several waypoints of an assigned 4D trajectory.

FIG. 1 illustrates an air transportation system 100, in accordance with an example implementation. The air transportation system 100 includes multiple aircraft such as aircraft 102A, 102B, and 102C. The aircraft 102A-102C may be equipped with trajectory-based FMCs.

The aircraft 102A-102C may be operated by corresponding aircraft operators 104A and 104B. The aircraft operators 104A-104B may include airlines, cargo companies, business aviation operators, or general aviation and military operators.

The aircraft 102A-102C and the aircraft operators 104A-104B are configured to be in communication with SWIM infrastructure 106. The SWIM infrastructure 106 is a National Airspace System (NAS)-wide information system that facilitates data sharing and may operate as a digital data-sharing backbone. The SWIM infrastructure 106 may enable increased common situational awareness and timely delivery of information to various agents and entities associated with air traffic. The SWIM infrastructure 106 may thus operate as an information-sharing platform that offers a single point of access for aviation data, with producers of data publishing it and users accessing the information through a single connection.

The SWIM infrastructure 106 may include computing and networking components and databases, which allow secure and reliable sharing of aeronautical information among the agents and various data sources. The aeronautical information is exchanged in standard formats to facilitate sharing and using of the information. For example, FIXM data format could be used for flight information. For weather information, Weather Information Exchange Model (WXXM) data format could be used. WXXM is designed to enable the management and distribution of weather data in digital format (XML). Further, WXXM is a member of a family of data models designed for use in aviation safety, notably Aeronautical Information Exchange Model (AIXM) and the FIXM.

For airspace, airport, and other relevant aeronautical information, AIXM data format could be used, and AIDL data format could be used for aircraft intent information. In examples, these various information elements and types may be provided via web services. In the case of air-ground communication, specific communication protocols such as Aircraft Communications Addressing and Reporting System (ACARS) and Aeronautical Telecommunication Network (ATN) protocols can be used for compatibility with legacy systems.

The air transportation system 100 may also include Air Navigation Service Providers (ANSPs) 108A and 108B. The ANSPs 108A-108B provide various services to the safe use of the shared airspace and airports. The ANSPs 108A-108B may include public or private legal entities providing Air Navigation Services. For example, the ANSPs 108A-108B may manage air traffic on behalf of a company, region or country. The ANSPs 108A-18B may be provide one or more of the following services to airspace users: air traffic management (ATM), communications, navigation and surveillance systems (CNS), meteorological service for air navigation (MET), search and rescue (SAR), and aeronautical information services/aeronautical information management (AIS/AIM). These services may be provided by ANSPs 108A-108B to during all phases of operations (e.g., during approach, aerodrome, and en-route).

The air transportation system 100 may include multiple aeronautical databases 110 in communication with the SWIM infrastructure 106. An example database includes a weather forecast database (WFDB) configured to store information associated with wind forecast, dangerous weather patterns, etc. for a region or a country. The WFDB may include a collection of databases distributed among different weather information providers.

Another example database includes a Global Trajectories Database (GTDB). The GTDB database may store trajectories of aircraft (e.g., the aircraft 102A-102C) for a particular region, country, or the whole global air traffic network. The GTDB may facilitate trajectory information sharing various entities. Authorized entities may access the GTDB via the SWIM infrastructure 106 to obtain information associated with a predicted trajectory for an aircraft with reasonable accuracy in space and time.

Another example database includes a Global Flight Status Database (GFDB). The GFDB may include information indicating current situation (e.g., position, speed, acceleration, altitude, heading, etc.) of a given flight. Each region or country may have its own GFDB, and these various databases may be unified in a single database.

Another example database includes one or more Airspace information Databases (ASDB). Each country or airspace region may have a corresponding ASDB. In examples, the air space of each country may be partitioned into sectors and routes. Some of these sectors and routes may be available for commercial or civilian flight, while other may be used by the military or closed for civilian flight. The ASDB may include static information such as information about available sectors and routes and sectors and routes that are closed. The ASDB may also include quasi-static information about sectors and routes that are temporarily not available as well as dynamic information associated with changes to the state of the airspace. For example, if a sector or some routes become unavailable for flight, the ASDB may be updated to include such information. Various entities can access such information via the SWIM infrastructure 106 so as to modify flight trajectories and routes to accommodate updates to the airspace.

Another example database includes an Airport Information Database (APDB). The APDB may include static information about airports such as layout of airport, map of the gates, configuration and number of runways, etc. The APDB may also include dynamic information associated with changes to airport operations such as when parts of the airport are closed, when a runway is closed, or when a landing strip becomes unavailable or available, etc. In examples, the ASDB and the APDB may be referred to collectively as aeronautical information databases.

Another example database includes an Aircraft Performance Database (ACPDB). The ACPDB database may include performance and capability information about the various aircraft models such as climb speed, acceleration, maximum speed, altitude capability, etc. This information may enable other entities in the air transportation system to accurately simulate and predict aircraft trajectory.

Another example database may include a database for models of how ATC works. Such models may enable various entities to predict ATC decisions in particular situations, and thus enable changing aircraft trajectory in a manner that is compliant with predicted ATC changes to the airspace.

The air transportation system 100 may also include a system 112 for resilient enhancement of trajectory-based operations (TBO). The system 112 may include multiple modules as described below and may include software modules and hardware components (e.g., servers, databases, processors, computing devices, computer readable media, memories, programmable instructions, etc.).

Figure 2:
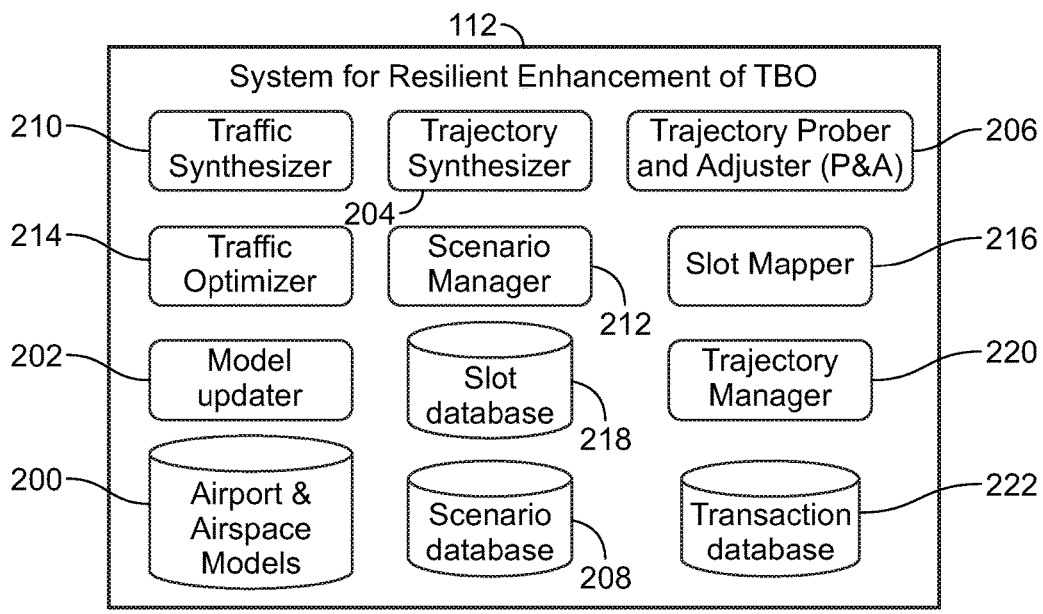
FIG. 2 illustrates a block diagram of a system for resilient enhancement of trajectory-based operations, in accordance with an example implementation.

FIG. 2 illustrates a block diagram of the system 112, in accordance with an example implementation. The different components and modules of the system 112 may be in communication with each other to exchange relevant information and updates. However, communication lines are not shown in FIG. 2 to reduce visual clutter in the drawing.

The system 112 includes an airport and airspace models module 200. Accuracy of computation of trajectories for aircraft may increase if the system 112 has access to accurate and up-to-date models for airports and airspaces. The ASDB and APDB are external databases that provide airport and airspace information to the system 112; however, the information provided by the ASDB and APDB might not be complete. The airport and airspace models module 200 may be in communication with the external ASDB and APDB and have access to the information stored therein, but may also have additional information.

Example additional information may include information related to airport capacity and capacities of particular airspace sectors. Another example of additional information includes models and rules specifying how the ATC would react in a particular situation. For example, the additional information may include rules of how the ATC would modify sequencing of arrival of flights when some fights arrive early. In examples, the ATC may be segmented into a plurality of controllers, each controller being responsible for a particular sector of the airspace. These sectors controller might not be well synchronized at all the times. The ATC may operate according to or apply rules and standards to make adjustments to sectors based on changes (cancellation or merger of flights, arrival and departure time changes, etc.) that take place in other sectors to enhance synchronization. The airport and airspace models module 200 may include such rules and standard to be able to predict changes performed by the ATC.

The System 112 may also include a model updater 202. The model updater 202 may be configured to monitor changes in the airspace or airports, e.g., monitor changes to the ASDB and APDB to ensure consistency between the models and real conditions. The model updater 202 may then update the models of the airport and airspace models module 200 to keep the models up-to-date. Operations of the model updater 202 are described in more details below with respect to FIG. 10.

The system 112 may also include a trajectory synthesizer 204. The trajectory synthesizer 204 may be configured to compute or determine trajectories of particular flights given an aircraft performance model and other information about the airspace and airports. The trajectory synthesizer 204 may generate the most likely trajectory that the aircraft would perform given present conditions.

For example, the trajectory synthesizer 204 may combine information from the airport and airspace models module 200, with information associated with available routes, performance models of aircraft, weather conditions and other information from the above-mentioned aeronautical databases 110, starting and end points of a flight to synthesize a probable trajectory for the flight. The probable trajectory generated by the trajectory synthesizer 204 may be a simulated trajectory, and might not be a final trajectory. In other words, the probable trajectory generated by the trajectory synthesizer 204 may be revised or updated based on other information as explained below.

The system 112 may also include a trajectory prober and adjuster (trajectory P&A) 206. The trajectory P&A 206 may receive probable trajectories generated by with the trajectory synthesizer 204 for several aircraft and flights, and may then determine feasibility or validity of these probable trajectories given other constraints. As an example, the trajectory P&A 206 may analyze the trajectories to determine whether they violate any safety rules or encroach each other in unsafe manner. For instance, the trajectory P&A 206 may determine whether two aircraft would maintain safe distances from each other when their trajectories come close to each other in space and time. As such, the trajectory P&A 206 may determine whether a particular probable trajectory is compatible with other probable trajectories.

In examples, the trajectory P&A 206 may have access to existing flight trajectories by being in communication with the GTDB and with scenario database 208 described below. In some examples, the trajectories included in the GTDB may be rough predictions that do not take into consideration rules, standards, and constraints applied by the ATC in particular situations. The trajectory P&A 206 may apply rules, standards, and constraints based on assumptions of how the ATC may react to existing conditions to determine feasibility of the various trajectories of the GTDB and the scenario database 208.

In examples, determining the feasibility of the trajectories may involve an iterative and ongoing process between the trajectory P&A 206, the trajectory synthesizer 204, the airport and airspace models module 200, and the scenario database 208. The airport and airspace models module 200 may be continually updating its models based on communication with the model updater 202, and feeding any changes to the trajectory synthesizer 204. The trajectory synthesizer 204 may then feed changes in probable trajectories to the trajectory P&A 206 to determine their feasibility. The predictions and feasibility analysis may be performed for a particular time horizon (e.g., up to a particular point in time in the near future) because conditions may keep changing.

The system 112 may further include a traffic synthesizer 210. The traffic synthesizer 210 may be configured to receive validated trajectories from the trajectory P&A 206 and build a mesh of trajectories of all or a subset of flights for a particular region in the airspace. For example, the traffic synthesizer 210 may generate a mesh of trajectories for flights flying across the United States of America or a region thereof. The traffic synthesizer 210 may take into consideration rules, standards, and constraints applied by the ATC to generate the mesh of trajectories.

The system 112 may also include a scenario manager 212. The scenario manager 212 may be configured to modify or update portions of the traffic mesh generated by the traffic synthesizer 210, without re-computing the entire mesh. For example, the scenario manager 212 may add a new trajectory to or remove a trajectory from the mesh. The scenario manager 212 may further modify the mesh based on receiving information indicating that airliners have exchanged trajectories or slots as described below, and accordingly update the mesh or a portion thereof. In this manner, the scenario manager 212 may perform incremental changes to the mesh and to predicted scenarios of flights.

Figure 3:
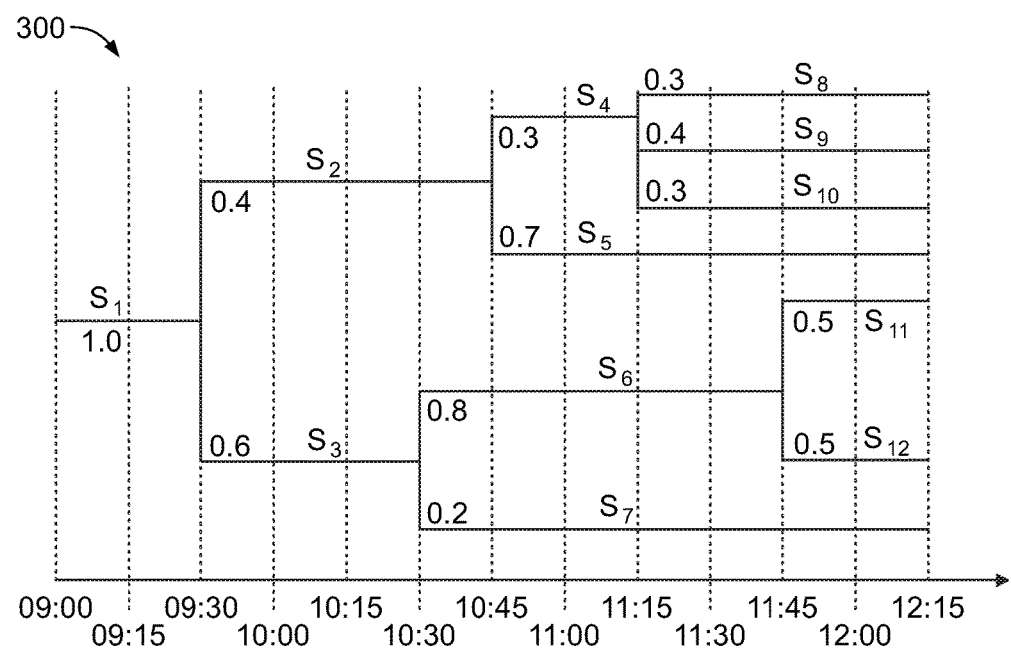
FIG. 3 illustrates an example scenario tree, in accordance with an example implementation.

In examples, the scenario manager 212 may be configured to generate a scenario tree. FIG. 3 illustrates an example scenario tree 300, in accordance with an example implementation. Both airport and sector capacities depend on the weather conditions such as the visibility, cloud ceiling and the location of thunderstorms, and are therefore prone to uncertainty. The scenario manager 212 may be configured to determine scenario tree forecasts of airport capacity from historical meteorological data.

Capacity uncertainty may be represented using the scenario tree 300. In the scenario tree 300, scenario S1 starts at 9 AM. At 9:30, scenario S2 could occur with probability 0.4 and scenario S3 could occur with probability 0.6. If scenario S2 occurs, then at 10:45 AM, scenario S4 could occur with probability 0.3 and scenario S5 could occur with probability 0:7, and so on. The capacity of a sector or a node during a scenario can be represented by a profile that specifies the capacity or envelope at each time during duration of the scenario. When determining a route for aircraft in given the scenario tree 300, e.g., by a traffic optimizer 214 described below, the traffic optimizer 214 may determine a trajectory for the aircraft for each scenario that could unfold.

Referring back to FIG. 2, the system 112 may further include the scenario database 208 mentioned above. The scenario database 208 may be configured to store the scenario trees and flight scenarios provided by other modules of the system 112. As mentioned above, the trajectory P&A 206 is in communication with the scenario database 208 and is configured to validate or determine feasibility of trajectories and scenarios in the scenario database 208. The trajectories and scenarios in the scenario database 208 may be built on assumptions on how the air traffic control reacts (ATC) in response to particular conditions.

The system 112 may also include the traffic optimizer 214. As mentioned above, the traffic optimizer 214 may be configured to generate a trajectory tree based on a scenario tree, e.g., the scenario tree 300, generated by the scenario manager 212. The traffic optimizer 214 generates a set of probable trajectories, and these probable trajectories form a trajectory tree. The trajectory tree may specify the location of the aircraft at each time during a scenario and conditional statements on what actions to perform as each new scenario unfolds.

For example, the trajectory tree for an aircraft given the scenario tree 300 in FIG. 3 might be "leave the gate at 9:05, arrive at the runway at 9:15, arrive at the departure point at 9:30; if scenario S2 occurs, proceed toward node n1 and arrive at 9:45; else, if scenario S3 occurs, proceed toward node n2 and arrive at 10:05," and so on. The trajectory tree satisfies the "coupling constraint" that any decision can be based on information that is available at the time that the decision is made, i.e., based on scenarios that have occurred up until that point in time.

The traffic optimizer 214 may further apply or execute an optimization algorithm to generate optimized or enhanced trajectories that reduce fuel consumption and time of flight taking into consideration rules, standards, and constraints applied by the ATC as well as pilot actions. There are several degrees of freedom or variables that might vary based on changes in flight conditions. For example, speed of an aircraft might change or the ATC might ask an aircraft to change its altitude when a particular flight condition arises, etc. The traffic optimizer 214 attempts to generate an optimal combination of the variables or degrees of freedom to generate an optimal trajectory.

In examples, while the scenario manager 212 may consider one flight or trajectory at a time while generating a scenario tree, the traffic optimizer 214 takes into consideration trajectories of different flights in a given sector, region, or country at the same time. In this manner, the traffic optimizer 214 determines optimal trajectories for the different flights such that the trajectories do not conflict with each other. Reactions of the ATC and pilots to various conditions that might emerge during flight may vary, and therefore the trajectories generated by the traffic optimizer 214 may be stochastic or probabilistic in nature.

The system 112 may also include a slot mapper 216. As mentioned above, airports and the ATC use slots assigned to different airliners. For example, when flight delays occur and an airport receives more flights at a given time window than expected, the ATC may use slots to manage and distribute the amount of delays for each flight. The slot mapper 216 communicates with the various modules of the system 112 and aeronautical databases 110 to maintain correspondence between the 4D trajectories generated by the traffic optimizer 214 and the slots used by the ATC to be compatible with the current practice of the ATC. This way, the traffic synthesizer 210 and the traffic optimizer 214 generate trajectories that are compatible with regulations related to slots.

The system 112 may also include a slot database 218. As mentioned above, there might be at least two types of slots. One type of slots is used for regulation of day-to-day operations at busy or congested airports. This type of slots is used to control arrival and departure times of flights and avoid disruption and delays that could compound at a busy airport. Airlines are obliged to use narrow time windows defined by the slots assigned to the airline to maintain traffic flow at the airports. This type of slots is used independently of emergencies (e.g., independent of emergency weather conditions) at busy airports.

A second type of slots is used when weather disruption or emergencies occur. If an emergency occurs, the ATC manages traffic by creating new slots to distribute delays among flights evenly. The slot database 218 may be configured to store information associated with slot assignments for the various airports and the emergency slots used by the ATC to manage traffic during emergencies.

The slot database 218 is updated when the slots assignments are changed. For example, the slot database 218 may be in communication with the SWIM infrastructure 106 and other entities connected thereto to remain up-to-date with slot assignments. Other modules of the system 112 (e.g., the slot mapper 216, the trajectory synthesizer 204, the traffic synthesizer 210, and the traffic optimizer 214) may be in communication with the slot database 218 to generate trajectories that comply with slots assignments. As such the slot assignments may be used as constraint when determining trajectories.

The system 112 may also include a trajectory manager 220. In examples, the trajectory manager 220 may be configured to make localized adjustments to the trajectories generated by other modules of the system 112. For instance, the traffic optimizer 214 may generate an optimized mesh of flight traffic in a region or country, but might not take into consideration some variables that are specific to an airline or a specific flight. The trajectory manager 220 may thus make further amendments to a given trajectory to handle requests (e.g., by an airline) for such adjustments.

In examples, the trajectory manager 220 allows airlines to exchange not only slot assignments, but also entire trajectories assigned to the airlines. In some examples, any operation regarding creation, removal, or exchange of trajectories are managed by the trajectory manager 220.

As an example, the trajectory manager 220 may create a trajectory that did not exist before. While the trajectory synthesizer 204 generates a simulation or a prediction of a trajectory, the trajectory manager 220 updates the scenario manager 212 and the scenario database 208 with an actual trajectory. The trajectory manager 220 further controls the sequence of operations performed by the system 112 and operates as an orchestrator or synchronizer between different components and modules of the system 112 as described below with respect to FIG. 4-10.

The system 112 may further include a transaction database 222. The transaction database 222 may be configured to maintain a log of any transactions, operations, or exchanges between airlines. For example, if two airlines exchange trajectories, or an airline trade a trajectory to another airline, a log of this transaction may be communicated to the transaction database 222. The trajectory manager 220 may then use this information stored in the transaction database 222 to perform local adjustments to the trajectories.

Components of the system 112 may be configured to work in an interconnected fashion with each other and/or with other components coupled to respective systems. One or more of the described operations or components of the system 112 may be divided up into additional operational or physical components, or combined into fewer operational or physical components. In some further examples, additional operational and/or physical components may be added to the examples illustrated by FIG. 2. Still further, any of the components or modules of the system 112 may include or be provided in the form of a processor (e.g., a microprocessor, a digital signal processor, etc.) configured to execute program code including one or more instructions for implementing logical operations described herein. The system 112 may further include any type of computer readable medium (non-transitory medium) or memory, for example, such as a storage device including a disk or hard drive, to store the program code that when executed by one or more processors cause the system 112 to perform the operations described above. In an example, the system 112 may be included within other systems. In another example, the components, or subset thereof, of the system 112 may be collectively referred to as a trajectory management module.

Figure 4:
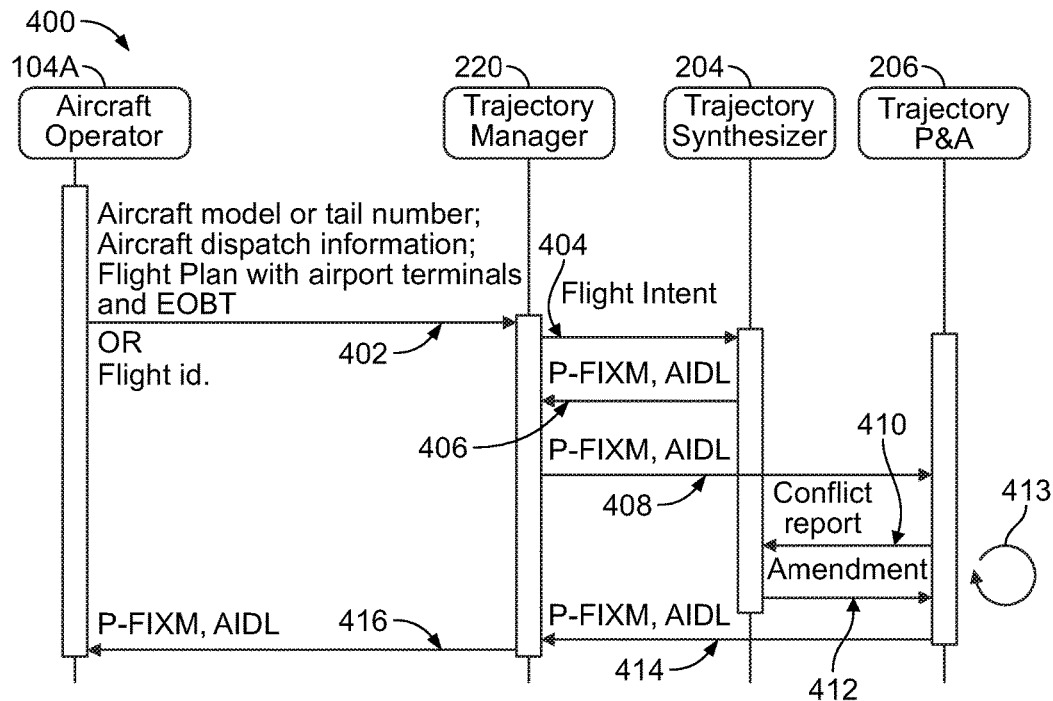
FIG. 4 illustrates a sequence diagram for a trajectory prediction operation, in accordance with an example implementation.

The system 112 may be configured to perform various types of operations and services illustrated in FIGS. 4-10. FIG. 4 illustrates a sequence diagram 400 for a trajectory prediction operation, in accordance with an example implementation. The sequence diagram 400 involves the aircraft operator 104A (or any other aircraft operator), the trajectory manager 220, the trajectory synthesizer 204, and the trajectory P&A 206.

At step 402 of the sequence diagram 400, the aircraft operator 104A provides flight intent information including aircraft type and model, fuel weight, flight identification number (ID), model, tail number for the flight, origin and destination, estimated off-block time (EOBT), etc. to the trajectory manager 220. In examples, if the flight intent information is associated with a repetitive flight, the aircraft operator 104A may provide the flight ID to the trajectory manager 220, which may then retrieve previously provided flight intent information associated with the flight ID. However, in other examples, the flight ID might not be included in the flight intent information.

At step 404, the trajectory manager 220 provides the flight intent information to the trajectory synthesizer 204. The trajectory synthesizer 204 may then generate a simulated trajectory that represents the most likely trajectory that the aircraft would perform given present conditions based on the flight intent information. At step 406, the trajectory synthesizer 204 provides the simulated trajectory in the P-FIXM or AIDL format back to the trajectory manager 220.

At step 408, the trajectory manager 220 provides the simulated trajectory to the trajectory P&A 206, which validates or determines the feasibility of the simulated trajectory given other trajectories of other flights and ATC constraints. If the trajectory P&A 206 identifies a conflict, it sends a conflict report back to the trajectory synthesizer 204 at step 410. The trajectory synthesizer 204 may then amend the simulated trajectory to take into consideration any conflict identified by the trajectory P&A 206, and send the amended trajectory back at step 412 to the trajectory P&A 206 for validation. This process is iterative and may last for several iterations as indicated by arrow 413.

If the trajectory P&A 206 validates the simulated trajectory and does not identify a conflict, or once the iterative process between the trajectory synthesizer 204 and the trajectory P&A 206 concludes with identifying a valid trajectory, the valid trajectory is sent back to the trajectory manager 220 at step 414. The trajectory manager 220 may then provide the valid trajectory at step 416 to the aircraft operator 104A to follow.

As such, the trajectory manager 220 coordinates activities and information between the various modules of the system 112. In examples, the trajectory manager 220 may be configured to transmit messages such as an acknowledgement message that a request for a valid trajectory for the flight has been received.

Figure 5:
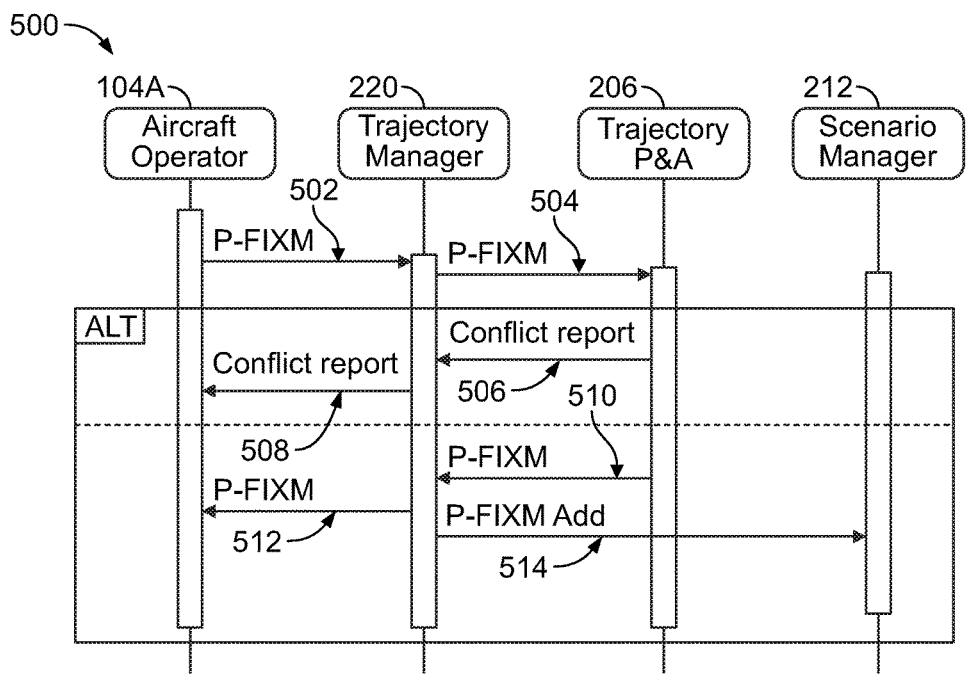
FIG. 5 illustrates a sequence diagram for a trajectory creation operation, in accordance with an example implementation.

FIG. 5 illustrates a sequence diagram 500 for a trajectory creation operation, in accordance with an example implementation. The sequence diagram 500 involves the aircraft operator 104A (or any other aircraft operator), the trajectory manager 220, the trajectory P&A 206, and the scenario manager 212.

In some examples, the aircraft operator 104A might have or receive accurate information about a particular flight. Accordingly, at step 502, the aircraft operator 104A may propose a new trajectory to the trajectory manager 220. The trajectory manager 220 may provide the proposed trajectory at step 504 to the trajectory P&A 206 for validation.

If the trajectory P&A 206 identifies a conflict, it sends a conflict report at step 506 back to the trajectory manager 220. The trajectory manager 220 may then provide the conflict report at step 508 to aircraft operator 104A indicating that the proposed trajectory is not valid.

On the other hand, if the trajectory P&A 206 does not identify conflicts, it may adjust the proposed trajectory to take into consideration rules of the ATC. For example, the trajectory P&A 206 may narrow down an arrival or departure window of the flight, and then send the adjusted trajectory back to the trajectory manager 220 at step 510 indicating that the adjusted trajectory is valid and feasible.

At step 512, the trajectory manager 220 sends the adjusted trajectory back to the aircraft operator 104A indicating that it is feasible, and that the aircraft operator 104A is allowed to use the trajectory. The trajectory manager 220 also sends the trajectory at step 514 to the scenario manager 212 to update the scenario and to be added to the scenario database 208. In examples, the trajectory manager 220 may also update the GTDB via the SWIM infrastructure 106 because the trajectory is validated and can thus be published to the global database.

In examples, the scenario manager 212 may add the created trajectory to a scenario change list. Changing one trajectory or adding a new trajectory may trigger other changes in the scenario. There is a batch of changes or buffer of changes that can be performed periodically and minimize the number of times in which the scenario changes in a major way. The batch of changes or buffer or changes may be stored in the scenario change list.

Figure 6:
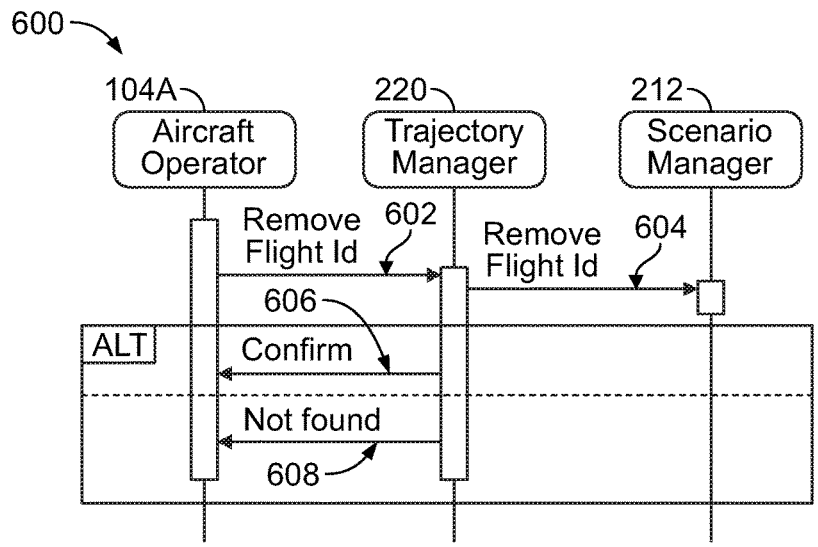
FIG. 6 illustrates a sequence diagram for a trajectory removal operation, in accordance with an example implementation.

FIG. 6 illustrates a sequence diagram 600 for a trajectory removal operation, in accordance with an example implementation. The sequence diagram 600 involves the aircraft operator 104A (or any other aircraft operator), the trajectory manager 220, and the scenario manager 212.

Once a trajectory is created, a flight or trajectory ID is created. In examples, a flight or trajectory may be cancelled, and the trajectory manager 220 may be configured to remove it. In another example, the trajectory manager 220 may decide to cancel a trajectory or flight in favor of another trajectory.

As an example, at step 602, the aircraft operator 104A sends a request to the trajectory manager 220 to remove a particular flight. If the trajectory manager 220 finds the trajectory or the flight ID, at step 604, the trajectory manager 220 seeks to remove the trajectory by sending a removal request to the scenario manager 212. The scenario manager 212 may then add this removal to the scenario change list. Also, at step 606, the trajectory manager 220 will send a confirmation message to the aircraft operator 104A indicating that the flight or trajectory has been removed. The trajectory manager 220 may also seek to remove the trajectory or flight from the GTDB via the SWIM infrastructure 106.

However, if the trajectory manager 220 determines that the flight ID or trajectory does not exist when the request is received at step 602, the trajectory manager 220 sends a message such as "Not found" back to the aircraft operator 104A at step 608.

Figure 7:
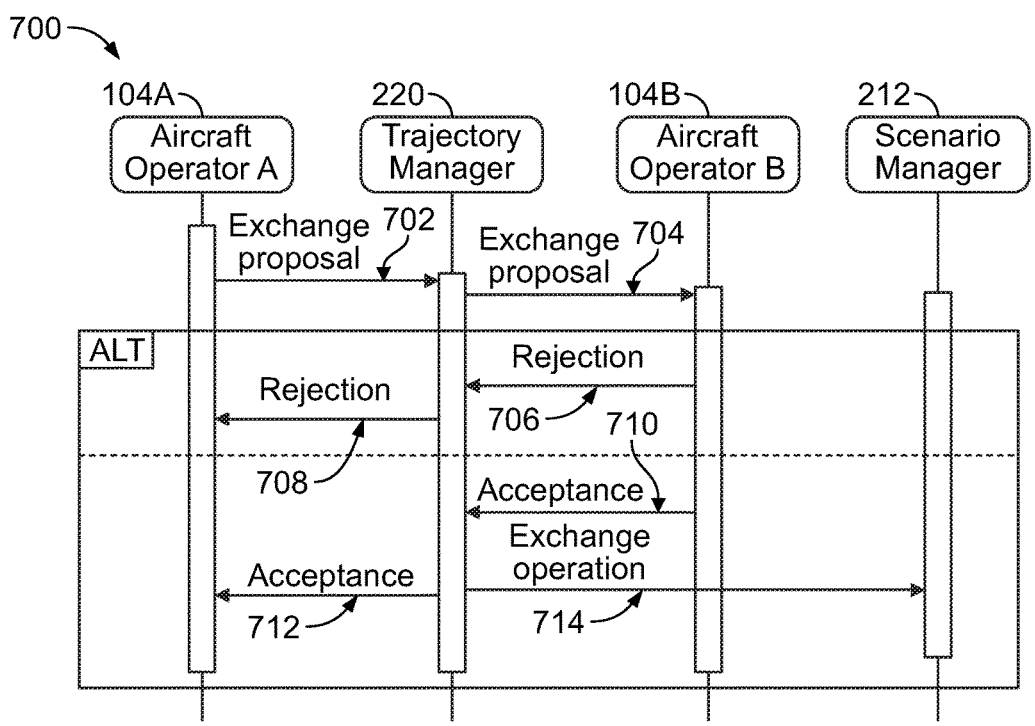
FIG. 7 illustrates a sequence diagram for a trajectory exchange operation, in accordance with an example implementation.

FIG. 7 illustrates a sequence diagram 700 for a trajectory exchange operation, in accordance with an example implementation. The sequence diagram 700 involves the aircraft operators 104A and 104B, the trajectory manager 220, and the scenario manager 212.

In examples, there could be two types of exchange operations between the two aircraft operators 104A and 104B. A first type may involve a swap where the aircraft operator 104A may propose a swap of one of its trajectories with another trajectory assigned to the aircraft operator 104B. A second type may involve a purchase where the aircraft operator 104A proposes to purchase a trajectory from the aircraft operator 104B.

As an example, aircraft operator A may have a trajectory "Ta." The aircraft navigating the trajectory may be late and might thus miss a connection in a hub airport. In this case, advancing the flight by a small period of time (e.g., 10 minutes) may enable the aircraft to make the connection. At the same time, aircraft operator B may have a trajectory "Tb" associated with the time window desired by aircraft operator A, for a flight which might be less constrained and can tolerate the delay. This situation may prompt aircraft operators A and B to exchange the trajectories "Ta" and "Tb." In examples, aircraft operator A may purchase the trajectory "Tb" from aircraft operator B, provided that aircraft operator B is able to create another trajectory to replace "Tb".

At step 702, the aircraft operator 104A proposes the swap or purchase by sending a proposal or request to the trajectory manager 220. At step 704, the trajectory manager 220 provides the proposal to the aircraft operator 104B. The aircraft operator 104B may then either reject or accept the proposal.

If the aircraft operator 104B rejects the proposal, at step 706 it sends information indicative of the rejection to the trajectory manager 220, which also provides the information back to the aircraft operator 104A at step 708. However, if the aircraft operator 104B accepts the proposal, it sends information indicative of the acceptance to the trajectory manager 220 at step 710.

At step 712, the trajectory manager 220 informs the aircraft operator 104A that the aircraft operator 104 accepted the exchange proposal. At step 714, the trajectory manager 220 also sends information about the exchange proposal to the scenario manager 212 to register the changes in the scenario change list. In examples, the trajectory manager 220 may update the GTDB with the changes of owners and flight identifiers. Further, the trajectory manager 220 may also store the information about the exchange in the transaction database 222.

Although FIG. 7 illustrates one of the aircraft operators 104A-104B initiating the exchange, in other examples, the trajectory manager 220 may initiate the proposal for an exchange between aircraft operators. In some examples, the exchange may be consummated asynchronously by gaining access to the transaction database 222.

It should be noted that FIG. 7 illustrates an exchange of complete trajectories, as opposed to an exchange of just slot assignments. In examples, the exchange may involve both a trajectory as well as slot assignment.

An exchange of trajectories between the aircraft operators 104A and 104B may result in modification to the exchanged trajectories. For example, an exchange of a trajectory may result in a change of the aircraft making the flight while taking the trajectory. A change of aircraft may change speed, altitude, etc. capabilities, and may thus cause changes to the trajectory. The traffic optimizer 214 may accordingly make adjustments to the trajectories, the trajectory mesh for a region, and flight scenarios to take into consideration such changes.

Figure 8:
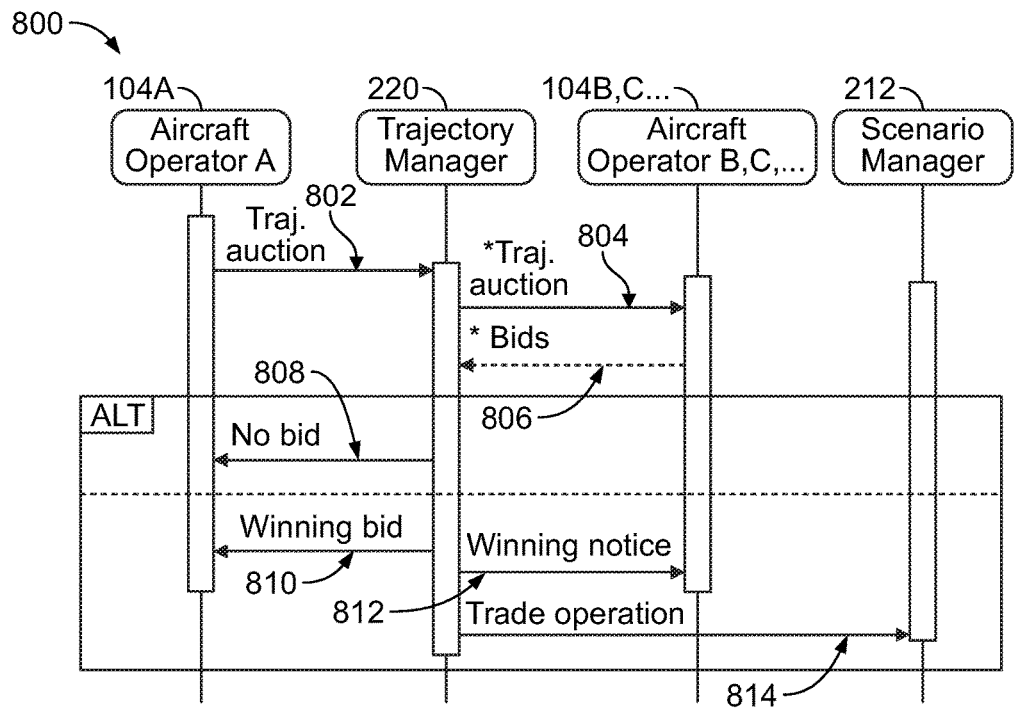
FIG. 8 illustrates a sequence diagram for a trajectory auction operation, in accordance with an example implementation.

FIG. 8 illustrates a sequence diagram 800 for a trajectory auction operation, in accordance with an example implementation. The sequence diagram 800 involves the aircraft operators 104A, 104B, and other aircraft operators, the trajectory manager 220, and the scenario manager 212.

The trajectory auction operation may start at step 802 where the aircraft operator 104A creates or initiates an auction to sell or exchange one of its trajectories. The aircraft operator 104A may for example transmit specific information about the auction including which trajectory is being auctioned, price requirements, deadlines, etc. to the trajectory manager 220.

At step 804, the trajectory manager 220 may publish the trajectory auction. For instance, the trajectory manager 220 may publish the auction information via a publish-subscribe service through the SWIM infrastructure 106. Other aircraft operators, such as the aircraft operator 104B, could be subscribers to the auction service, and are thus notified of the auction.

At step 806, each aircraft operator 104B, C, etc. may make a bid with a price to the trajectory manager 220. If no valid bids are received until the deadline, the trajectory manager 220 may notify the aircraft operator 104A at step 808 and the transaction may be closed.

Otherwise, the trajectory manager 220 may notify the aircraft operator 104A of the winning bid at step 810, and also notifies the winner aircraft operator by sending a winning notice thereto at step 812. The trajectory manager 220 further sends details of the operation to the scenario manager 212 at step 814, and may also store the auction details including the offer and bids, in the transaction database 222.

Although FIG. 8 illustrates one of the aircraft operators 104A initiating the auction operation, in other examples, the trajectory manager 220 may initiate the auction operation. In some examples, the auction operation may be consummated asynchronously by gaining access to the transaction database 222.

Figure 9:
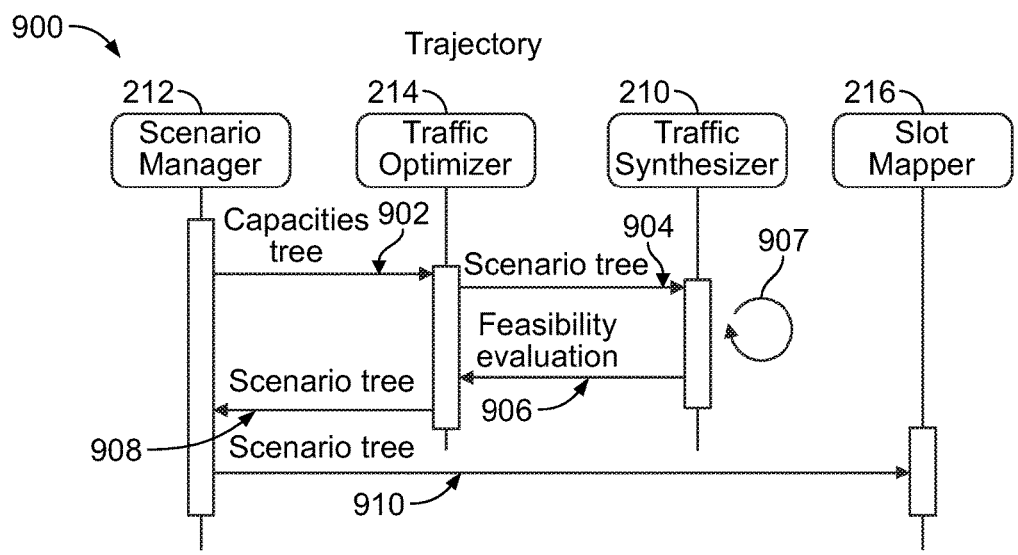
FIG. 9 illustrates a sequence diagram for a scenario optimization operation, in accordance with an example implementation.

FIG. 9 illustrates a sequence diagram 900 for a scenario optimization operation, in accordance with an example implementation. The sequence diagram 900 involves the aircraft scenario manager 212, the traffic optimizer 214, the traffic synthesizer 210, and the slot mapper 216.

At step 902, the scenario manager 212 may receive relevant data from the airport and airspace models 200 in order to build a capacities tree, which is a probabilistic tree of resource capacities. The traffic optimizer 214 may implement an algorithm that generates probabilistic trajectory forests composing a scenario tree (e.g., the scenario tree 300) fitted to time bins of a particular period of time (e.g., 5 minutes). As an example, the algorithm may involve determining for each tree branch a trajectory that reduces a cost function given flight constraints. The cost function as an example could represent sum of revenues of airline operators minus costs. By determining a trajectory that reduces this cost function, the collective airline benefit is increased, with flight delays being implicitly reduced.

After the traffic optimizer 214 determines the trajectories for the scenario tree, it provides the scenario tree and the associated determined trajectories to the traffic synthesizer 210 at step 904. The traffic synthesizer 210 may then refine the scenario tree by simulating air traffic management actions by the ATC to produce detailed trajectories with accurate and small time granularity (e.g., by the second).

The traffic synthesizer 210 thus generates for each scenario branch a number of fine granularity realizations of this branch. The traffic synthesizer 210 may also generate a measure of feasibility for this branch. As an example, the measure may be an aggregated measure of deviation of the feasible trajectories from the "target" trajectories proposed by the traffic optimizer 214. For instance, it is assumed that "j" is the feasible trajectory, which corresponds to the target trajectory "J." If the trajectory "j" is followed, the arrival time would be "tj," whereas if the trajectory J is followed, the arrival time would be "tJ." For purposes of calculating the measure "tj" may be shifted to coincide with "tJ." Then, the traffic synthesizer 210 may backtrack and, for each time tJ–k, determine a point in the trajectory "j" which corresponds to a point in the trajectory "J". The root mean square of these differences may be considered as a measure of spatial deviation of the trajectories. The difference tj–tJ is a measure of temporal deviation of the trajectories, but the difference in the duration of the trajectories may be also accounted for. The duration of one of the trajectories might be compressed or stretched in order to synchronize departure and arrival for calculating the spatial deviation, with compression factor accounted in the measure. This way, both spatial and temporal measures of deviation are determined. In examples, a weighting between spatial and temporal measures may be applied.

At step 906, the traffic synthesizer 210 provides the feasibility measures to the traffic optimizer 214, together with a delay report. The traffic optimizer 214 may then apply an acceptability criteria test (e.g., amount of deviation from the bins in the last scenario tree) for the branches taking into consideration the feasibility evaluation and the delay report received from the traffic synthesizer 210. If the acceptability criteria are met, the operation is finished. Otherwise, the traffic optimizer 214 may change the flight constraints and the algorithm is re-run. As such, determining the trajectories for the scenario tree could be an iterative process as indicated by arrow 907, e.g., the steps 904 and 906 could be repeated several times.

Once the trajectories that satisfy the cost function and the flight constraints are determined, the scenario tree and the associated determined trajectories are sent to the scenario manager 212 at step 908. The scenario manager 212 may then send the tree and the trajectories to the slot mapper 216, which may determine slot assignments based on the received scenario tree and the determined trajectories. The scenario manager 212 may also update the slot database 218 at step 910 in order to define which flight trajectory is associated to each existing slot. The scenario manager 212 may further update the GTDB via the SWIM infrastructure 106. The SWIM infrastructure 106 may then facilitate distributing the new trajectories to the participants of the system 112, including the aircraft operators 104A-104B, the aircraft 102A-102C, and the ANSPs 108A-108B.

Figure 10:
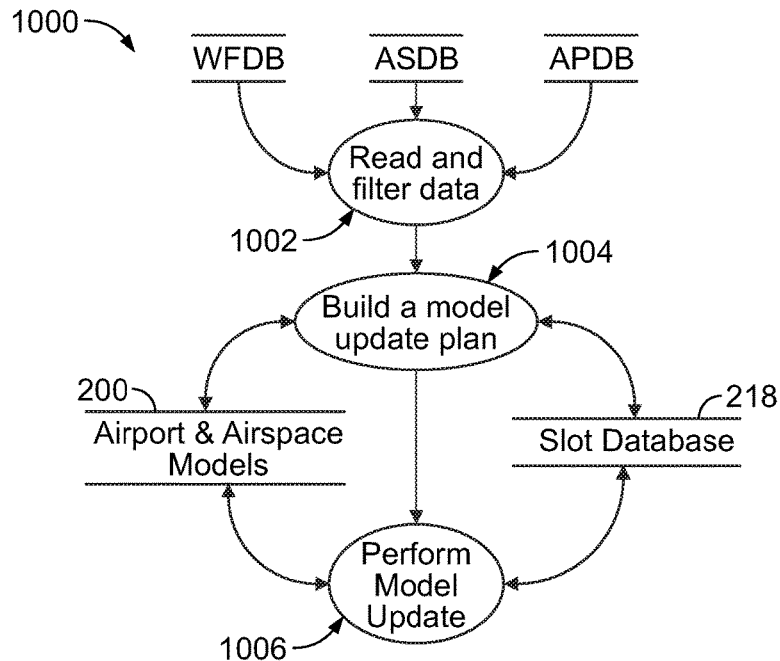
FIG. 10 illustrates a diagram for a model update operation, in accordance with an example implementation.

FIG. 10 illustrates a diagram 1000 for a model updating operation, in accordance with an example implementation. The model updating operation illustrated by the diagram 1000 may be performed by the model updater 202 of the system 112. Further, the model updating operation may be performed periodically to continually update the various models and databases of the system 112, or could be triggered by an event monitor when a change is detected, and a change to the databases or models is justified.

At block 1002, the model updater 202 may receive, read, and filter data received from the WFDB, the ASDB, and the APDB mentioned above. If the data received indicate a change, such as a weather forecast change or a change in airport or airspace capacity, the model updater 202 may be configured to build a model update plan at block 1004. The model update plan may be built to synchronize the updating of the airport and airspace models 200 and the slot database 218. Otherwise, if the updating happens incrementally for one database without updating the other or without taking into consideration a proper sequence of updating information, inconsistencies and loss of information may occur.

Upon building the model update plan, the model updater 202 may perform model updating at block 1006. Particularly, the model updater 202 may update the airport and airspace models 200 and also update the slot database 218 as a result of changes to slot assignments.

As an example, an airport capacity may change due, for example, to a reduction in capacity of a runway. This reduction may result in a change in the capacity of the whole airport and the APDB may be changed accordingly. The change in airport capacity may result in a change in slot assignments of the various flights that would have used the runway. The model updater 202 reads these changes at the block 1002. The model updater 202 then builds a plan at block 1004 to synchronize updating the airport and airspace models 200 and the slot database 218 and determine the proper sequence to be followed in the updating. The model updater 202 then performs the plan at the block 1006. Now, other modules that perform their operations based on information in the airport and airspace models 200 and the slot database 218 may have access to accurate and up-to-date information.

Although FIGS. 4-10 illustrate each operation independently, in other examples, the system 112 may be configured to perform a combination of these operations and services together, in sequence or in parallel. In other examples, the operations in FIGS. 4-10 could be combined In examples, some of the components and modules of the system 112 may be located on the ground, while other components or modules may be airborne and coupled to aircraft (e.g., the aircraft 102A, 102A, 102C, etc.). For example, some components or modules, or portions of modules (hardware, software, or a combination thereof) may be mounted to the aircraft for controlling its trajectory.

Figure 11:
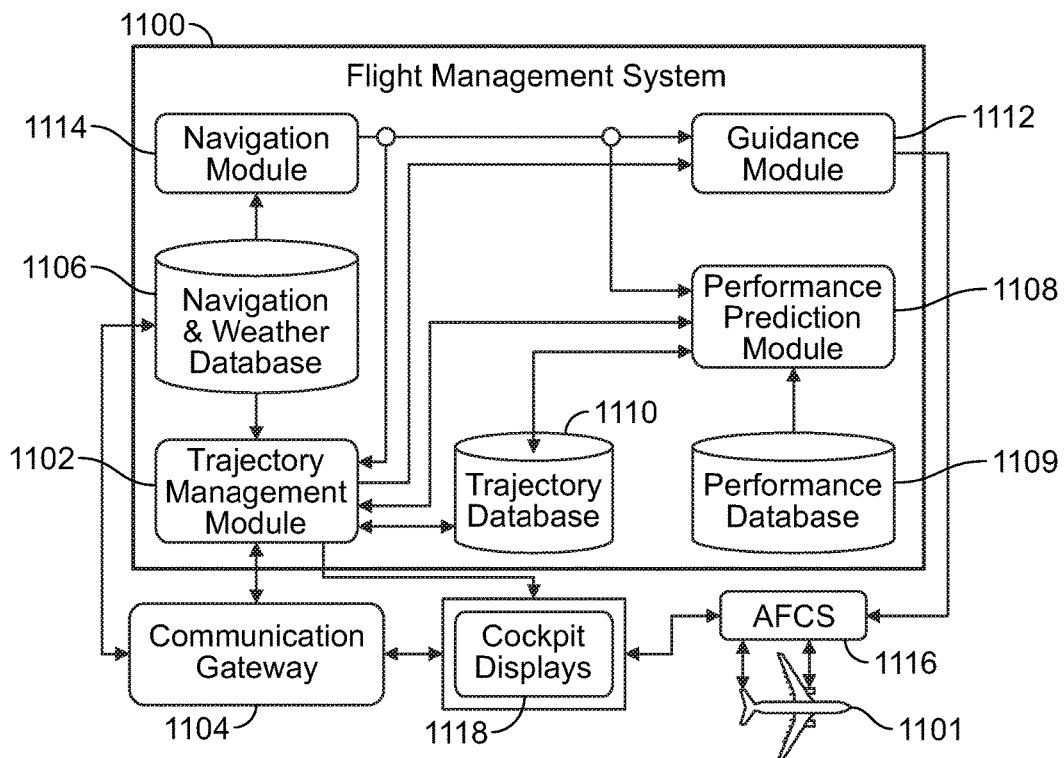
FIG. 11 illustrates a flight management system of an aircraft, in accordance with an example implementation.

FIG. 11 illustrates a flight management system 1100 of an aircraft 1101, in accordance with an example implementation. The flight management system 1100 may include a trajectory management module 1102 that receives from a communication gateway 1104 a flight mission which can be a flight plan or a trajectory. The communication gateway 1104 may have received the trajectory from a flight mission originator through the SWIM infrastructure 106, and the trajectory can assume one of the following data formats: an ACARS flight plan, an AIDL file, or a FIXM file. Each of these formats may impose different constraints for the trajectory or mission that the aircraft has to accomplish.

A navigation and weather database 1106 may include or receive via the communication gateway 1104 weather and airspace information and may impose constraints to the mission. In examples, the navigation and weather database 1106 may partially replicate the airport and airspace models 200.

A 4D trajectory prediction objective is then created and sent to a performance prediction module 1108. The performance prediction module 1108 may have a trajectory prediction algorithm configured to generate an optimized trajectory for the given constraints. The flight management system 1100 may include a performance database 1109 that has performance and capability information about the aircraft 1101 such as climb speed, acceleration, maximum speed, altitude capability, etc. This information may enable performance prediction module 1108 to accurately simulate and predict a trajectory for the aircraft 1101.

If the performance prediction module 1108 is not successful in finding a solution for the given constraints, the lack of success is communicated to the trajectory management module 1102, which then sends an "UNABLE" notification to the communication gateway 1104. Otherwise, the performance prediction module 1108 communicates the solution to the trajectory management module 1102, which then sends an "ACCEPT" notification to the communication gateway 1104. In either case, the communication gateway 1104 forwards the resulting notification to the flight mission originator via the SWIM infrastructure 106. In examples, the performance prediction module 1108 may be part of the traffic synthesizer 210.

Once a feasible trajectory is determined by the performance prediction module 1108, the trajectory is saved to a trajectory database 1110, and the trajectory management module 1102 generates segment commands to a guidance module 1112 configured to control the aircraft 1101 to accomplish the trajectory solution. For example, the guidance module 1112 may use the generated segment commands in addition to position, velocity, and wind measurements for the aircraft 1101 received from a navigation module 1114 to generate airspeed, vertical, and turn rate commands.

The guidance module 1112 may then communicate the airspeed, vertical, and turn rate commands to an automatic flight control system (AFCS) 1116, which in turn controls engine thrust and aerodynamic control surfaces of the aircraft 1101 in order to achieve the commands of the guidance module 1112. Information from the various modules and components shown in FIG. 11 may be displayed on cockpit displays 1118 for pilots to see and monitor the above-described operations and information.

The communication gateway 1104 is also capable of sending the current aircraft position and state data, as well as its intent and trajectory, to external network nodes, so as to provide such information to the aircraft operator (e.g., the aircraft operators 104A-104B), the ANSP (e.g., the ANSPs 108A-108B), or any other agent connected to the SWIM infrastructure 106.

In examples, the communication gateway 1104 handles air-ground communications over various network infrastructures such as ACARS, ATN, and IPS (Internet Protocol Suite). The contents of the communications may include aeronautical data link applications, such as Future Air Navigation System (FANS) and LINK 2000+, which are enabled by ACARS and ATN as well as the SWIM infrastructure 106, which is enabled by IPS. The SWIM infrastructure 106 in turn facilitates the full implementation of trajectory-based operations described above with respect to the system 112.

The communication gateway 1104 may also facilitate sharing of the following information with any other node integrated with the SWIM infrastructure 106: WXXM for weather information; FIXM for flight plan and 4D trajectory information; AIDL for aircraft intent information; and AIXM for airport, airspace and other relevant aeronautical information. The sharing of this information and access to other data transactions may be performed via the various operations of the SWIM infrastructure 106 such that the aircraft 1101 is continually updated with the most recent information affecting its flight and trajectory.

The components and modules illustrated in FIG. 11 may be configured to work in an interconnected fashion with each other and/or with other components coupled to respective systems. One or more of the described operations or components in FIG. 11 may be divided up into additional operational or physical components, or combined into fewer operational or physical components. In some further examples, additional operational and/or physical components may be added to the examples illustrated by FIG. 11. Still further, any of the components or modules of FIG. 11 may include or be provided in the form of a processor (e.g., a microprocessor, a digital signal processor, etc.) configured to execute program code including one or more instructions for implementing logical operations described herein. The components and modules of FIG. 11 may further include any type of computer readable medium (non-transitory medium) or memory, for example, such as a storage device including a disk or hard drive, to store the program code that when executed by one or more processors cause the modules and components to perform the operations described above. In an example, the flight management system 1100 and other components and modules of FIG. 11 may be included within other systems.

Figure 12:
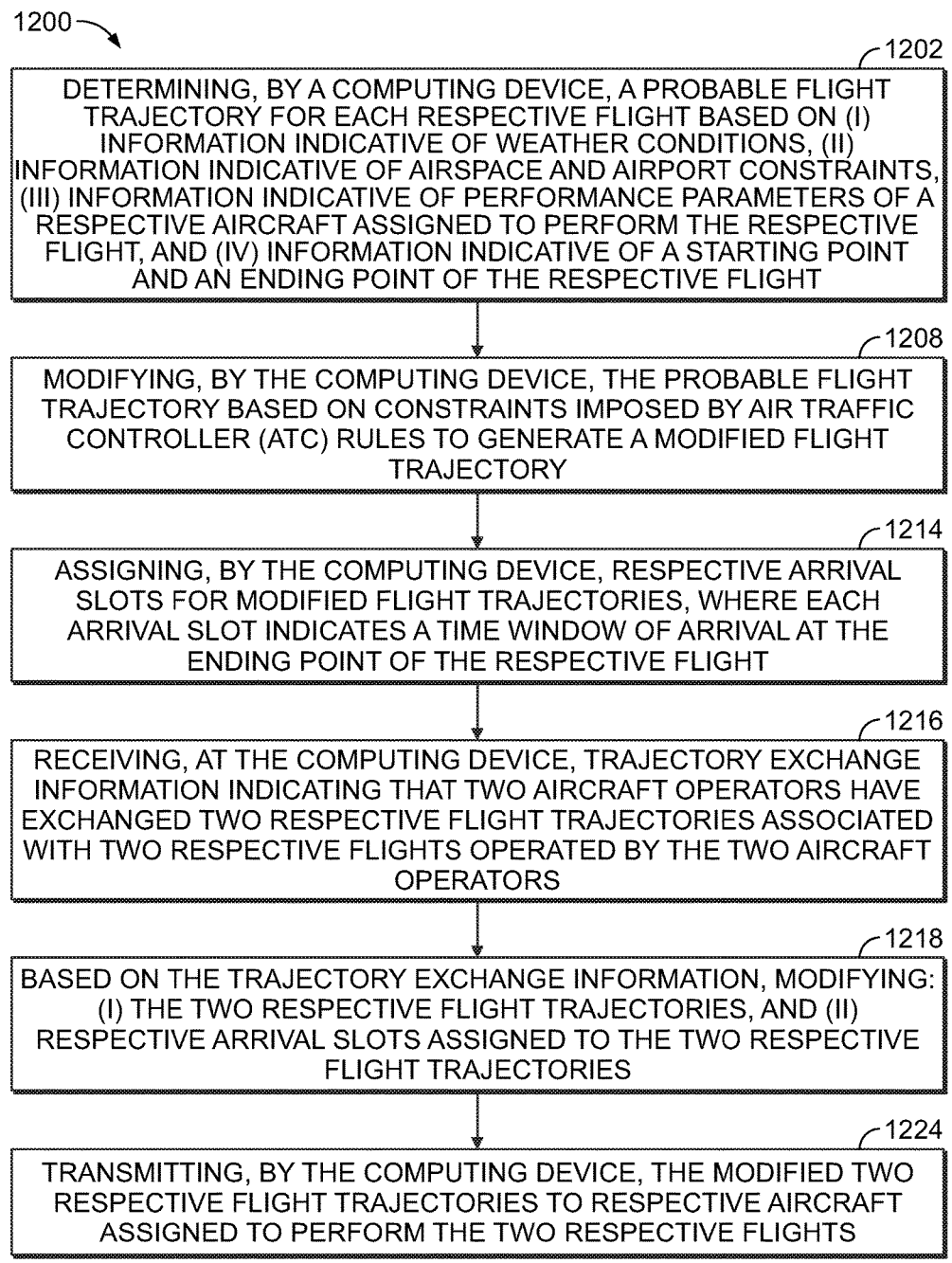
FIG. 12 is a flowchart of a method for determining flight trajectories for respective flights, in accordance with an example implementation.
Figure 13:
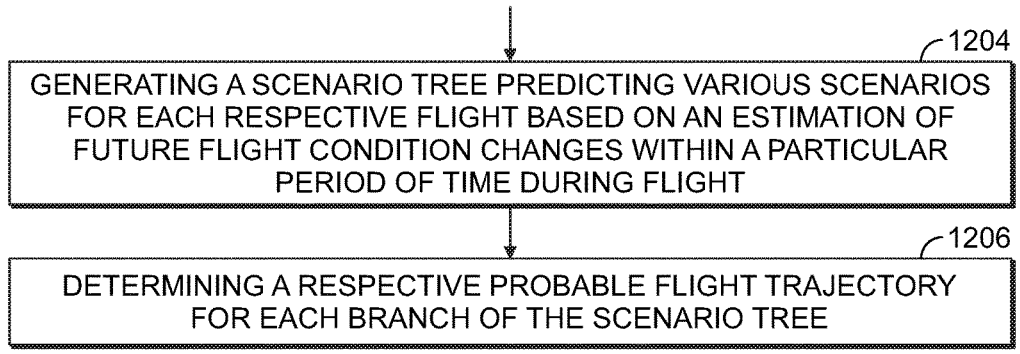
FIG. 13 is a flowchart of a method for use with the method of FIG. 12, in accordance with an example implementation.
Figure 14:
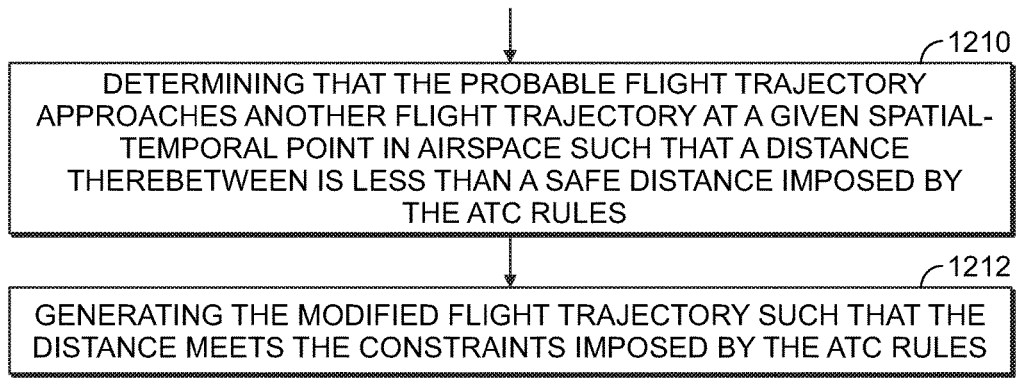
FIG. 14 is a flowchart of a method for use with the method of FIG. 12, in accordance with an example implementation.
Figure 15:
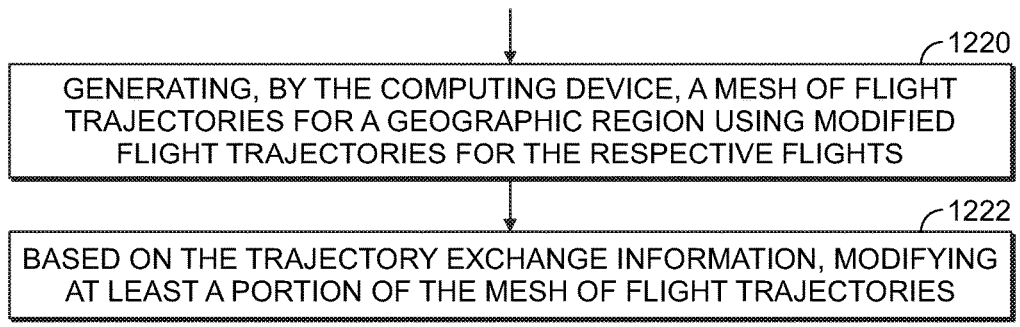
FIG. 15 is a flowchart of a method for use with the method of FIG. 12, in accordance with an example implementation.

FIG. 12 is a flowchart of a method 1200 for determining flight trajectories for respective flights, in accordance with an example implementation. The method 1200 could, for example, be performed by the system 112. Further, FIGS. 13-15 are flowcharts of methods for use with the method 1200.

The method 1200 may include one or more operations, or actions as illustrated by one or more of blocks 1202-1224. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1200 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1200 and other processes and operations disclosed herein, one or more blocks in FIGS. 12-15 may represent circuitry or digital logic that is arranged to perform the specific logical operations in the process.

At block 1202, the method 1200 includes determining, by a computing device, a probable flight trajectory for each respective flight based on (i) information indicative of weather conditions, (ii) information indicative of airspace and airport constraints, (iii) information indicative of performance parameters of a respective aircraft assigned to perform the respective flight, and (iv) information indicative of a starting point and an ending point of the respective flight. As mentioned above, the system 112, e.g., the trajectory synthesizer 204, may determine a probable or likely trajectory for a flight given information obtained from various databases and models. For instance, the databases could include the WFDB and ACPDB among others. The airport and airspace models 200 may provide the information associated with airspace and airport capacity. By having information indicating the starting or departure point and the ending or arrival point, the system 112 may determine a probable trajectory.

FIG. 13 is a flowchart of a method for use with the method 1200, in accordance with an example implementation. At block 1204, the method includes generating a scenario tree predicting various scenarios for each respective flight based on an estimation of future flight condition changes within a particular period of time during flight. As mentioned above, in examples, the system 112 may be configured to generate a scenario tree (e.g., the scenario tree 300) to predict various scenarios that could unfold within a particular time horizon. At block 1206, the method includes determining a respective probable flight trajectory for each branch of the scenario tree. The system 112 may determine a probable trajectory for each branch and may finalize a given probable trajectory when a particular scenario occurs. The system 112 may thus continually update the scenarios and probable trajectories.

Referring back to FIG. 12, at block 1208, the method 1200 includes modifying, by the computing device, the probable flight trajectory based on constraints imposed by ATC rules to generate a modified flight trajectory. As mentioned above, the system 112, e.g., the trajectory P&A 206, may receive the probable trajectory and adjust it based on ATC rules.

FIG. 14 is a flowchart of a method for use with the method 1200, in accordance with an example implementation. At block 1210, the method includes determining that the probable flight trajectory approaches another flight trajectory at a given spatial-temporal point in airspace such that a distance therebetween is less than a safe distance imposed by the ATC rules. The trajectory P&A 206 may have information associated with other trajectories that may cross the airspace. The trajectory P&A 206 may determine that at a given point in time and space, the probable trajectory may approach another trajectory such that a distance between two aircraft may become unsafe or violate ATC rules. At block 1212, the method includes generating the modified flight trajectory such that the distance meets the constraints imposed by the ATC rules. The trajectory P&A 206 may modify the trajectory to comply with ATC rules and constraints to maintain a safe distance between aircraft while traversing the airspace.

Referring back to FIG. 12, at block 1214, the method 1200 includes assigning, by the computing device, respective arrival slots for modified flight trajectories, wherein each arrival slot indicates a time window of arrival at the ending point of the respective flight. The system 112 may receive the modified trajectory and assign slots (e.g., time window of arrival). The systems and methods disclosed herein allow for flexibility in assigning slots as opposed to rigidly assigning slots to airlines for long periods of time without allowing other entities to change slots assignments.

At block 1216, the method 1200 includes receiving, at the computing device, trajectory exchange information indicating that two aircraft operators have exchanged two respective flight trajectories associated with two respective flights operated by the two aircraft operators. The systems and method disclosed above allow airlines to exchange entire trajectories as well as slots. For example, the system 112 (e.g., the trajectory manager 220) may receive information indicating that two airline operators exchanged two respective trajectories for two respective flights.

At block 1218, the method 1200 includes, based on the trajectory exchange information, modifying: (i) the two respective flight trajectories, and (ii) respective arrival slots assigned to the two respective flight trajectories. The trajectory exchange information may indicate that, as a result of the trajectory exchange, there is a change in aircraft models of aircraft assigned to perform the two respective flights. The different aircraft may have different performance capabilities (e.g., speed, acceleration, altitude capabilities, etc.). Thus, modifying the two respective flight trajectories is based on a change in performance capability corresponding to the change in aircraft models.

FIG. 15 is a flowchart of a method for use with the method 1200, in accordance with an example implementation. At block 1220, the method includes generating, by the computing device, a mesh of flight trajectories for a geographic region using modified flight trajectories for the respective flights. In examples, as mentioned above, the system 112 (e.g., the traffic synthesizer 210) may receive trajectories for various flights in a particular region or country, and may accordingly generate a mesh of trajectories for the region. At block 1222, the method includes, based on the trajectory exchange information, modifying at least a portion of the mesh of flight trajectories. As a result of the trajectory exchange at the block 1216, and the associated modification of the trajectories and slots, the system 112 may modify the mesh of trajectories, or at least locally change a portion of the mesh that is affected by the exchange.

Referring back to FIG. 12, at block 1224, the method 1200 includes transmitting, by the computing device, the modified two respective flight trajectories to respective aircraft assigned to perform the two respective flights. As mentioned above, the system 112 may transmit, directly or via the SWIM infrastructure 106, trajectories to respective aircraft. For example, each aircraft may have or be in communication with a respective communication gateway 1104 and may receive the trajectory associated with its flight via the communication gateway 1104. The communication gateway 1104 may then provide the trajectory to other modules of the system 1100, e.g., the trajectory management module 1102. The trajectory management module 1102 may generate segment commands and provide the segment commands to the guidance module 1112. The guidance module 1112 may use the generated segment commands in addition to position, velocity, and wind measurements for the aircraft 1101 received from the navigation module 1114 to generate airspeed, vertical, and turn rate commands. The guidance module 1112 may then control the aircraft to accomplish or navigate the trajectory.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method for determining flight trajectories for respective flights, the method comprising:
   determining, by a computing device, a probable flight trajectory for each respective flight based on (i) information indicative of weather conditions, (ii) information indicative of airspace and airport constraints, (iii) information indicative of performance parameters of a respective aircraft assigned to perform the respective flight, and (iv) information indicative of a starting point and an ending point of the respective flight;

modifying, by the computing device, the probable flight trajectory based on constraints imposed by Air Traffic Controller (ATC) rules to generate a modified flight trajectory;

assigning, by the computing device, respective arrival slots for modified flight trajectories, wherein each arrival slot indicates a time window of arrival at the ending point of the respective flight;

receiving, at the computing device, trajectory exchange information indicating that two aircraft operators have exchanged two respective flight trajectories associated with two respective flights operated by the two aircraft operators;

based on the trajectory exchange information, modifying, by the computing device, (i) the two respective flight trajectories, and (ii) respective arrival slots assigned to the two respective flight trajectories; and transmitting, by the computing device, the modified two respective flight trajectories to respective flight management computing devices of respective aircraft to execute the modified two respective flight trajectories.

2. The method of claim 1, wherein the trajectory exchange information indicates a change in aircraft models of aircraft assigned to perform the two respective flights, wherein modifying the two respective flight trajectories is based on a change in performance parameters corresponding to the change in aircraft models.

3. The method of claim 1, further comprising:
determining that the probable flight trajectory approaches another flight trajectory at a given spatial-temporal point in airspace such that a distance therebetween is less than a safe distance imposed by the ATC rules, wherein modifying the probable flight trajectory comprises:
generating the modified flight trajectory such that the distance meets the constraints imposed by the ATC rules.

4. The method of claim 1, wherein the computing device has access to a database including information indicating assumptions related to how an ATC reacts to different flight conditions, and wherein determining the probable flight trajectory is further based on the information indicating the assumptions.

5. The method of claim 1, wherein the computing device has access to a database comprising information indicating flight parameters including position, speed, acceleration, altitude, and heading direction of aircraft traversing an airspace, and wherein determining the probable flight trajectory is further based on the information indicating the flight parameters.

6. The method of claim 1, further comprising:
generating, by the computing device, a mesh of flight trajectories for a geographic region using modified flight trajectories for the respective flights; and
based on the trajectory exchange information, modifying at least a portion of the mesh of flight trajectories.

7. The method of claim 1, further comprising:
generating a scenario tree predicting various scenarios for each respective flight based on an estimation of future flight condition changes within a particular period of time during flight, wherein determining the probable flight trajectory for each respective flight comprises:
determining a respective probable flight trajectory for each branch of the scenario tree.

8. A non-transitory computer readable medium having stored therein instructions that, in response to execution by a computing device, cause the computing device to perform operations to determine flight trajectories for respective flights, the operations comprising:
determining a probable flight trajectory for each respective flight based on (i) information indicative of weather conditions, (ii) information indicative of airspace and airport constraints, (iii) information indicative of performance parameters of a respective aircraft assigned to perform the respective flight, and (iv) information indicative of a starting point and an ending point of the respective flight;
modifying the probable flight trajectory based on constraints imposed by Air Traffic Controller (ATC) rules to generate a modified flight trajectory;
assigning respective arrival slots for modified flight trajectories, wherein each arrival slot indicates a time window of arrival at the ending point of the respective flight;
receiving trajectory exchange information indicating that two aircraft operators have exchanged two respective flight trajectories associated with two respective flights operated by the two aircraft operators;
based on the trajectory exchange information, modifying: (i) the two respective flight trajectories, and (ii) respective arrival slots assigned to the two respective flight trajectories; and
transmitting the modified two respective flight trajectories to respective flight management computing devices of respective aircraft to execute the modified two respective flight trajectories.

9. The non-transitory computer readable medium of claim 8, wherein the trajectory exchange information indicates a change in aircraft models of aircraft assigned to perform the two respective flights, wherein modifying the two respective flight trajectories is based on a change in performance parameters corresponding to the change in aircraft models.

10. The non-transitory computer readable medium of claim 8, wherein the operations further comprise:
determining that the probable flight trajectory approaches another flight trajectory at a given spatial-temporal point in airspace such that a distance therebetween is less than a safe distance imposed by the ATC rules, wherein modifying the probable flight trajectory comprises:
generating the modified flight trajectory such that the distance meets the constraints imposed by the ATC rules.

11. The non-transitory computer readable medium of claim 8, wherein the computing device has access to a database including information indicating assumptions related to how an ATC reacts to different flight conditions, and wherein determining the probable flight trajectory is further based on the information indicating the assumptions.

12. The non-transitory computer readable medium of claim 8, wherein the computing device has access to a database comprising information indicating flight parameters including position, speed, acceleration, altitude, and heading direction of aircraft traversing an airspace, and wherein determining the probable flight trajectory is further based on the information indicating the flight parameters.

13. The non-transitory computer readable medium of claim 8, wherein the operations further comprise:

generating a mesh of flight trajectories for a geographic region using modified flight trajectories for the respective flights; and based on the trajectory exchange information, modifying at least a portion of the mesh of flight trajectories.

14. The non-transitory computer readable medium of claim 8, wherein the operations further comprise:

generating a scenario tree predicting various scenarios for each respective flight based on an estimation of future flight condition changes within a particular period of time during flight, wherein determining the probable flight trajectory for each respective flight comprises:

determining a respective probable flight trajectory for each branch of the scenario tree.

15. A system for determining flight trajectories for respective flights, comprising:

a flight management computing device coupled to a first aircraft and having one or more processors configured to send thrust and attitude commands for the first aircraft to follow an assigned flight trajectory;

one or more databases including information indicative of (i) weather conditions, (ii) airspace and airport constraints, and (iii) performance parameters of a respective aircraft assigned to perform a respective flight; and a trajectory management module that is ground-based and in communication with the one or more databases and in communication with the flight management computing device via an air-ground data link, wherein the trajectory management module comprises:

one or more processors, and memory storing thereon instructions, that when executed by the one or more processors of the trajectory management module, cause the trajectory management module to perform operations comprising:

determining a probable flight trajectory for each respective flight based on the information of the one or more databases and information indicative of a starting point and an ending point of the respective flight, modifying the probable flight trajectory based on constraints imposed by Air Traffic Controller (ATC) rules to generate a modified flight trajectory, assigning respective arrival slots for modified flight trajectories, wherein each arrival slot indicates a time window of arrival at the ending point of the respective flight, receiving trajectory exchange information indicating that a first aircraft operator of the first aircraft and a second aircraft operator of a second aircraft have exchanged two respective flight trajectories associated with the first and second aircraft, based on the trajectory exchange information, modifying: (i) the two respective flight trajectories, and (ii) respective arrival slots assigned to the two respective flight trajectories, and transmitting a respective flight trajectory of the two respective flight trajectories to the flight management computing device to execute the respective flight trajectory by the first aircraft.

16. The system of claim 15, wherein the trajectory exchange information indicates that an aircraft model of the first aircraft is different from a respective aircraft model of the second aircraft, wherein modifying the two respective flight trajectories is based on a change in performance parameters corresponding to difference in aircraft models between the first and second aircraft.

17. The system of claim 15, wherein the operations further comprise:

determining that the probable flight trajectory approaches another flight trajectory at a given spatial-temporal point in airspace such that a distance therebetween is less than a safe distance imposed by the ATC rules, wherein modifying the probable flight trajectory comprises:

generating the modified flight trajectory such that the distance meets the constraints imposed by the ATC rules.

18. The system of claim 15, wherein the one or more databases further include information indicating assumptions related to how an ATC reacts to different flight conditions, and wherein determining the probable flight trajectory is further based on the information indicating the assumptions.

19. The system of claim 15, wherein the one or more databases further include information indicating flight parameters including position, speed, acceleration, altitude, and heading direction of aircraft traversing an airspace, and wherein determining the probable flight trajectory is further based on the information indicating the flight parameters.

20. The system of claim 15, wherein the operations further comprise:

generating a mesh of flight trajectories for a geographic region using modified flight trajectories for the respective flights; and based on the trajectory exchange information, modifying at least a portion of the mesh of flight trajectories.

\* \* \* \* \*